US006657752B1

United States Patent
Tseng

(10) Patent No.: US 6,657,752 B1
(45) Date of Patent: Dec. 2, 2003

(54) INSTALLATION FOR IMPROVING A SCANNING RANGE OF SCANNER ALONG AN AXIAL DIRECTION OF A LIGHT SOURCE

(75) Inventor: Jen-Shou Tseng, Miao-Li Hsien (TW)

(73) Assignee: Umax Data Systems, Inc., Hsinchu (TW)

(*) Notice: Subject to any disclaimer, the term of this patent is extended or adjusted under 35 U.S.C. 154(b) by 0 days.

(21) Appl. No.: 09/535,500

(22) Filed: Mar. 24, 2000

(30) Foreign Application Priority Data

Dec. 18, 1999 (TW) .................................. 88222560 U

(51) Int. Cl.⁷ .................. G02B 27/00; F21V 33/00; F21V 5/00; H04N 1/04
(52) U.S. Cl. ................. 358/475; 358/474; 358/509; 362/140; 362/330; 362/332; 359/601
(58) Field of Search ................ 358/474, 475, 358/509, 484, 296, 482, 483; 362/13, 135, 140, 330, 331, 332; 359/601, 614

(56) References Cited

U.S. PATENT DOCUMENTS 5,696,607 A * 12/1997 Yamana et al. ............ 358/474

5,737,096 A * 4/1998 Takeuchi et al. ............ 358/475
5,959,746 A * 9/1999 Tsai ........................... 358/475
6,166,832 A * 12/2000 Fujimoto .................... 358/484

FOREIGN PATENT DOCUMENTS

JP 59-33446 * 2/1984 ........... G03B/27/62

* cited by examiner

Primary Examiner—Edward Coles
Assistant Examiner—Jason Sherrill
(74) Attorney, Agent, or Firm—J.C. Patents

(57) ABSTRACT

An installation for increasing the usable scanning range along the axial direction of a light source. The installation includes a linear light source and a light-channeling panel. The linear light source has a light axis whose brightness near the mid-portion is higher than the brightness level on either side. The light-channeling panel is adjacent to the linear light source and is capable of concentrating more light in the end sections rather than the mid-portion of the light axis. The light-channeling panel is made from a plurality of panels, each made from materials having different light transparencies. The light transparency of the light-channeling panel near the central section of the light axis is lower than the light transparency at the end sections of the light axis. Hence, after light from the linear light source has passed through the light-channeling panel, a band of light having a more homogenous brightness level than the linear light source is produced.

9 Claims, 4 Drawing Sheets

INSTALLATION FOR IMPROVING A SCANNING RANGE OF SCANNER ALONG AN AXIAL DIRECTION OF A LIGHT SOURCE

CROSS-REFERENCE TO RELATED APPLICATION

This application claims the priority benefit of Taiwan application serial no. 88222560, filed Dec. 18, 1999.

BACKGROUND OF THE INVENTION

1. Field of Invention

The present invention relates to the light source of a scanner. More particularly, the present invention relates to an installation for improving a scanning range of a scanner along an axial direction of a light source.

2. Description of Related Art

In general, a scanning system can be roughly classified as a reflective type or a light-penetrating type. In the reflective scanning system, a document is placed over a transparent glass panel. Light from a light source travels through the transparent glass panel and impinges upon the document. The light is reflected back from the document to reach an optical sensor after passing through a set of optical elements. The optical sensor for forming a scan image, for example, can be a charge couple device (CCD). In the light-penetrating scanning system, the document is also placed on top of a transparent glass panel. However, light from a light source has to pass through the document, the transparent glass panel and a set of optical elements before arriving at the optical sensor.

Hence, both the reflective and the transparent type of scanning system operate on similar principles. In a reflective scanning system, brightness variation of reflected light from a document is gauged to produce a scan image. On the other hand, in a transparency scanning system, brightness variation of light after passing through the document is gauged to produce a scan image.

However, the conventional linear light source of a scanner has one major drawback. Brightness level close to the mid-section along the axial direction of a light source is higher than the brightness level on each side. Hence, image produced by the light source is brighter in the middle. Since a scanner works according to differences in brightness level, capacity for detecting brightness contrast near both ends of the light axis is lower. If the variation in brightness level along the axial direction of the light source is large, a section close to both ends of the light axis is unsuitable for forming any images.

Several means have been proposed to reduce brightness variation along the axial direction of the light source, several means are proposed. For example, in an invention described in Taiwan Patent No. 244013 titled 'Improved brightness compensation of an optical scanner through a modified lamp shade structure', brightness variation along the axial direction of a light source is improved by modifying the lamp-shade.

In another invention described in Taiwan Patent No. 204363 titled 'Image-forming optical system for a scanner', the external structure of the lamp tube is directly modified. For example, two lamp tubes are used instead of one so that compensatory back reflection is increased. Consequently, brightness levels between the central and the side portions along the axial direction of the lamp tubes are almost identical when onto a document. However, the invention demands major modifications of many structural elements. Hence, cost of production is high.

In another invention described in Taiwan Patent No. 352886 titled 'A lens structure and its integration with an image-reading device', a method of improving brightness level along the axial direction of a light source is proposed. By changing the degree of reflectivity of a coated film on the reflecting lens inside a scanner, brightness level variation is reduced. However, the reflectivities of more than one reflecting lens need to be modified, thereby increasing the production cost necessary to achieve the results.

In short, the smaller the variation in brightness level along the axial direction of a light source, the better the scanning width of a document and brightness contrast are. Although all the conventional methods are capable of reducing brightness variation along the axial direction of a light source, major structural modification of components are unnecessary.

SUMMARY OF THE INVENTION

Accordingly, one object of the present invention is to modify a component in a scanner so that the useful range along the axial direction of a light source is increased. The component is a light-channeling panel and the modification is a variation of light transparency across the surface of the light-channeling panel.

To achieve these and other advantages and in accordance with the purpose of the invention, as embodied and broadly described herein, the invention provides an installation for increasing the useful range along the axial direction of a light source. The installation includes a linear light source and a light-channeling panel. The linear light source has a light axis whose brightness near the mid-portion is higher than the brightness level on either side. The light source provides a necessary beam of light for image scanning by the scanner.

The light-channeling panel is adjacent to the linear light source and is capable of concentrating more light to the end sections rather than the mid-portion of the light axis. The light-channeling panel is made from a plurality of panels, each being made from a panel material having a light transparency different from the others. The light transparency of the light-channeling panel near the central section of the light axis is lower than the light transparency at the end sections of the light axis. Hence, after light from the linear light source passes through the light-channeling panel, a band of light having more homogenous brightness level than the linear light source is produced.

This invention also provides a second installation for increasing the useful range along the axial direction of a light source, which installation includes a linear light source, a light-channeling panel, an optical transmission system and an optical sensor. The linear light source has a light axis whose brightness level near the middle portion is higher than the brightness level on each side. The light source provides a necessary beam of light for scanning a document by the scanner. The light-channeling panel is adjacent to the linear light source and is capable of concentrating more light in the end sections rather than the middle of the light axis. The light-channeling panel is formed by attaching a plurality of panels with each panel made from a material having a different light transparency. The light transparency of the light-channeling panel near the central section of the light axis is lower than the light transparency at the end sections of the light axis. Hence, after light from the linear light source passes through the light-channeling panel, a band of light having a more homogenous brightness level than the linear light source is produced. The optical transmission system transmits the light that has passed through the document or the light that has reflected from the document. The optical sensor picks up the light from the optical transmission system for producing a scan image.

This invention also provides a third installation for increasing the useful range along the axial direction of a light source that includes a linear light source, a light-channeling panel and a contact image sensor (CIS). The linear light source has a light axis whose brightness level near the middle portion is higher than the brightness level on each side. The light source provides a necessary beam of light for scanning a document by the scanner. The light-channeling panel is adjacent to the linear light source and is capable of concentrating more light near the end of the light axis. The light-channeling panel is formed by attaching a plurality of panels, each panel being made from a panel material having a light transparency different from the others. The light transparency of the light-channeling panel near the central section of the light axis is lower than the light transparency at the end sections of the light axis. Hence, after light from the linear light source passes through the light-channeling panel, a band of light having more homogenous brightness level than the linear light source is produced. The contact image sensor picks up the light that has passed through the document or the light that has reflected from the document for producing a scan image.

In brief, this invention homogenizes the brightness level along the light axis by changing the light transparency across the surface of the light-channeling panel.

It is to be understood that both the foregoing general description and the following detailed description are exemplary, and are intended to provide further explanation of the invention as claimed.

DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
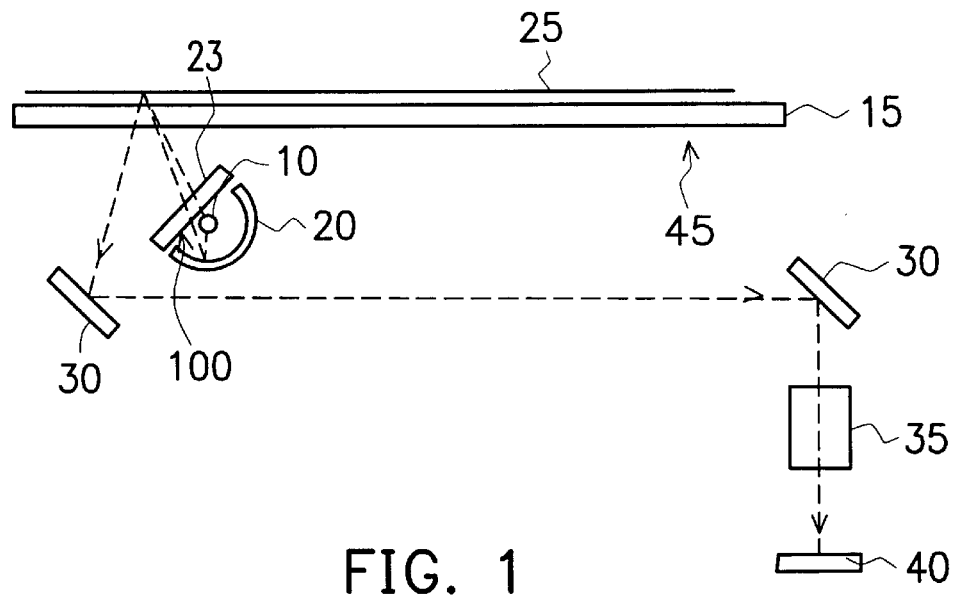
FIG. 1 is a schematic view of a scanning system capable of producing a more uniform brightness level along axial direction of a light source according to a first preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view of a scanning system capable of producing a more uniform brightness level along an axial direction of a light source according to a first preferred embodiment of this invention. The scanning system includes a linear light source 10, a transparent glass panel 15, a light reflector 20, a light-channeling panel 23, a document 25, a plurality of reflecting mirrors 30, a lens 35 and an optical sensor 40. The linear light source 10 has a light axis perpendicular to the plane of the page on which FIG. 1 lies and provides the necessary light beam for scanning the document 25. The reflector 20 is positioned on one side of the linear light source 10 for reflecting light from the linear light source 10 to the light-channel panel 23. The light-channel panel 23 concentrates more light in the end sections rather than the mid-portion of the light axis. The reflecting mirrors 30 together pick up light reflected from the document 25 and transmit the same to the lens 35. The optical sensor 40 is a device for receiving the optical image from the lens 35 so that a scan image can be produced.

The linear light source 10 has a light axis whose brightness level near the middle portion is higher than the brightness level on either side. The light-channeling panel 23 is formed by joining a plurality of panels with each panel being made from a material having a light transparency different from the others. The light transparency of the light-channeling panel near the central section of the light axis is lower than the light transparency near the end sections of the light axis. Hence, after light originating from the linear light source 10 is permitted to pass through the light-channeling panel 23, a band of light having more homogenous brightness level than the linear light source 10 is produced.

Figure 2:
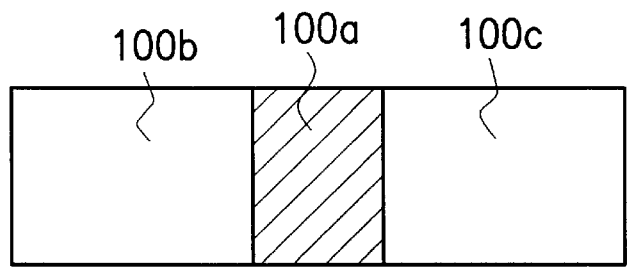
FIG. 2 is a side view of a surface of the light-channeling panel shown in FIG. 1.

FIG. 2 is a side view showing the inner surface 100 of the light-channeling panel 23 that faces the linear light source 10. The light-channeling panel 23 is actually formed using three panels 100a, 100b and 100c with each panel being made from a panel material having a light transparency different from the others. Light transparency of panel 100a is lower than the light transparency of panels 100b and 100c. In this embodiment, panels made of three different panel materials having three different light transparencies are used on the inner surface 100 of the light-channeling panel 23. However, there is no limit to the number of panels with different light transparencies used on the surface of the light-channeling panel.

Figure 6A:
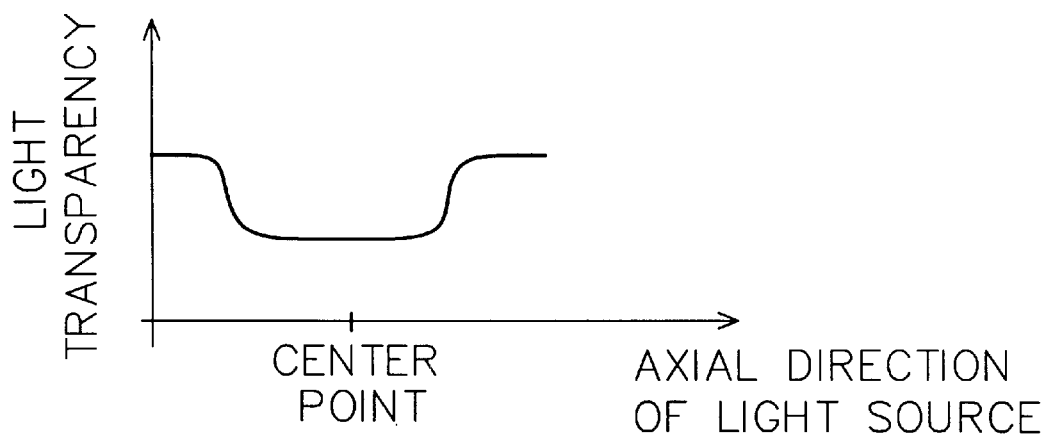
FIG. 6a is a graph showing the variation in light transparency of the light-channeling panel along the light axis of the light source.

FIG. 6a is a graph showing the variation of light transparency of the light-channeling panel along the light axis of the light source. As shown in FIG. 6a, light transparency is low near the middle section of the light axis while light transparency is high near the ends of the light axis. As shown in FIG. 2, the low light transparency region corresponds to a surface having the panel 100a while the high transparency regions on each side correspond to surface having the panels 10b and 100c, respectively.

Figure 6B:
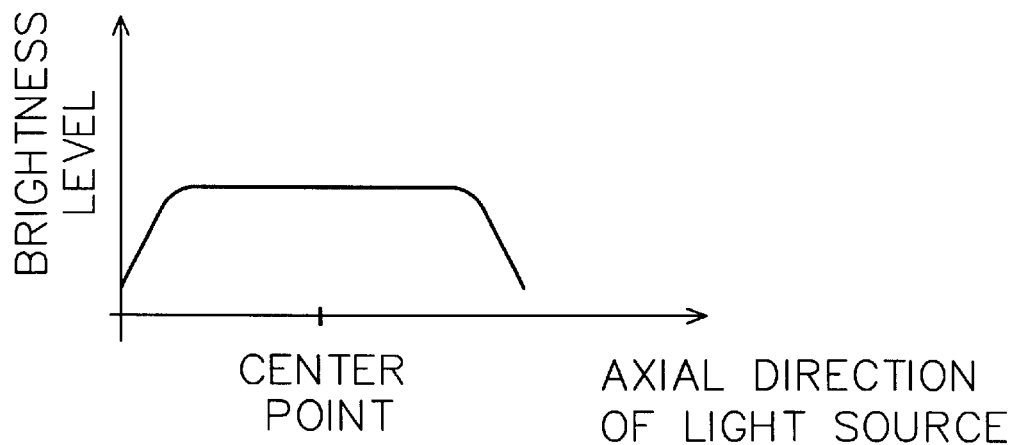
FIG. 6b is a graph showing the variation in brightness level of the light source along the light axis of the light source.
Figure 6C:
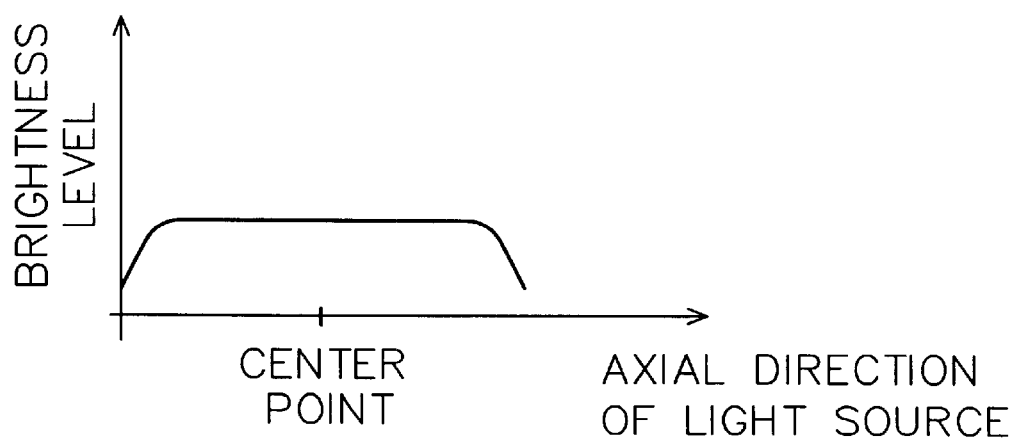
FIG. 6c is a graph showing the variation of brightness level of light along the light axis of the light source after a beam of light from the light source has passed through the light-channeling panel.

FIG. 6b is a graph showing the variation of brightness level of the linear light source along the light axis of the light source. FIG. 6c is a graph showing the variation of brightness level of light along the light axis of the light source after a beam of light from the light source has passed through the light-channeling panel. As shown in FIGS. 6b and 6c, the uniformly bright region along the light axis for light emerging from the light-channeling panel 23 is wider than the uniformly bright region of the original light source 10.

Hence, compared with a conventional light source, the useful range in the light axis is increased when identical length light tubes are used. Conversely, length of light tube can be reduced when identical range of light axis is specified.

Figure 3:
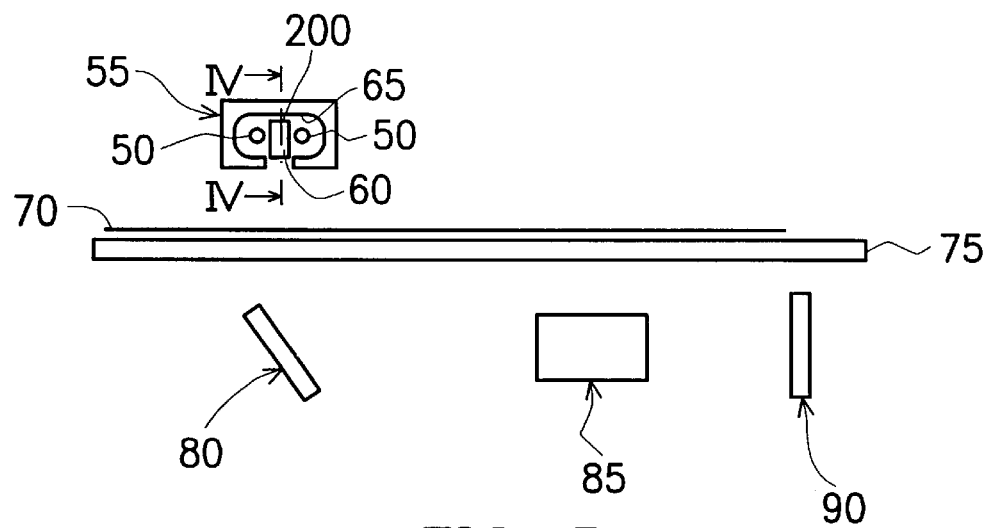
FIG. 3 is a schematic view of a scanning system capable of producing a more uniform brightness level along axial direction of a light source according to a second preferred embodiment of this invention.

FIG. 3 is a schematic view of a scanning system capable of producing a more uniform brightness level along axial direction of a light source according to a second preferred embodiment of this invention. In the second embodiment, the installation includes two linear light sources 50, a lamp shade 55, a light-channeling panel 60, a reflector 65, a document 70, a transparent glass panel 75, a reflecting mirror 80, a lens 85 and an optical sensor 90.

The two linear light sources 50 have parallel light axes perpendicular to the plane of the page on which FIG. 3 lies and provide the necessary light beam for scanning the document 70. The light-channeling panel 60 is positioned between the two linear light sources 50. The light-channeling panel 60 and the reflector 65 are employed to smooth out the light produced by the two linear light sources 50 along a light axes. The reflecting mirror 80 reflects the light from the linear light sources 50 via the reflector 65, the light-channeling panel 60 and the document 70 to the lens 85. The image on the lens 85 is transmitted to the optical sensor 90 where a scan image is formed.

The linear light sources 50 together produce a light axis whose brightness level near the middle portion is higher than the brightness level on each side. The light-channeling panel 60 is formed by joining together a plurality of panels, each panel being made from a panel material having a light transparency different from the others. The light transparency of the light-channeling panel 60 near the central section of the light axis is lower than the light transparency near the end sections of the light axis. Hence, after light originating from the linear light sources 50 is permitted to pass through the light-channeling panel 60, a band of light having more homogenous brightness level than the linear light source 10 is produced.

Figure 4:
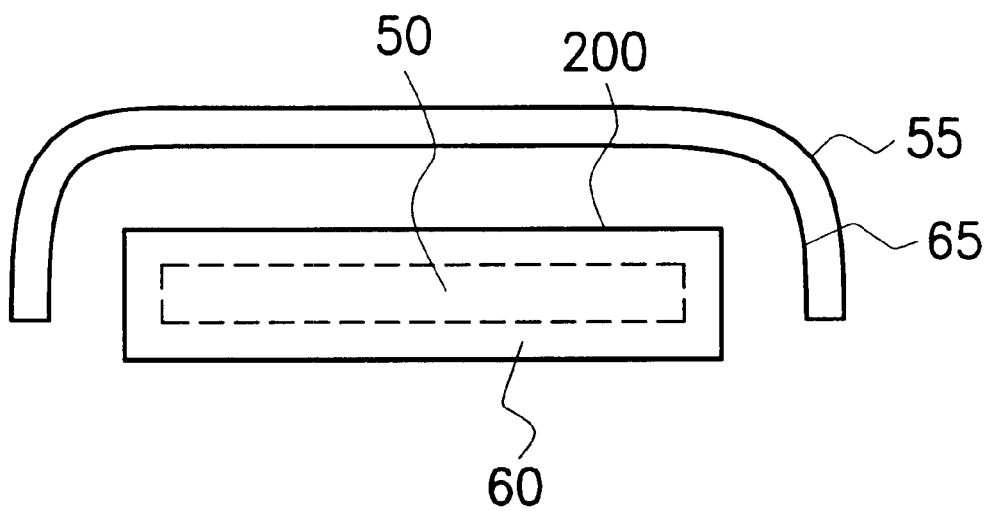
FIG. 4 is a cross-sectional view along line IV—IV of FIG. 3.

FIG. 4 is a cross-sectional view along line IV—IV of FIG. 3. As shown in FIG. 4, the first surface 200 of the light-channel panel 60 is formed using different panel materials, each having a different light transparency. In addition, the light transparency near the mid-portion of the light axis is lower than the light transparency near either ends of the light axis. Light generated by the linear light sources 50 is reflected between the reflector 65 and the light-channeling panel 60 many times before emerging from the first surface 200 of the light-channeling panel 60. Since more light is allowed to pass through the end sections of the panel 60, brightness level along the light axis is more homogenous.

Figure 5:
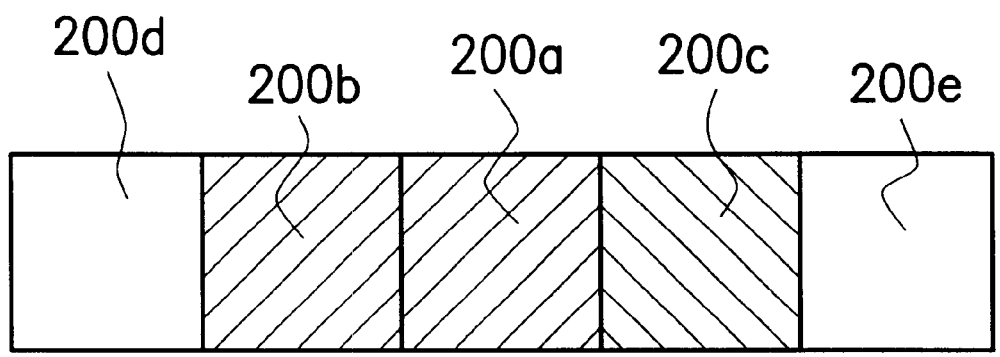
FIG. 5 is a side view of the light-channel panel of FIG. 3.

FIG. 5 is a side view showing the first surface 200 of the light-channel panel 60 shown in FIG. 3. In the second embodiment, the surface 200 of the light-channeling panel 60 is formed using five panels 200a, 200b, 200c, 200d and 200e with each panel being made from a panel material having a different light transparency. Light transparency of panel 200a is lower than the light transparency of panels 200b and 200c. Similarly, panel 200b has a light transparency lower than the panel 200d, and the panel 200c has a light transparency lower than the panel 200e. In this embodiment, five different panel materials are used on the first surface 200 of the light-channeling panel 60. However, there is no limit to the number of panel materials with different light transparencies that can be used on the surface of the light-channeling panel.

FIG. 6a is a graph showing the variation of light transparency of the light-channeling panel along the light axis of the light source. As shown in FIG. 6a, light transparency is low near the middle section of the light axis while light transparency is high near the ends of the light axis. As shown in FIG. 5, the lowest light transparency region corresponds to the surface having the panel 200a. The higher transparency regions further out on either side correspond to surfaces having the panels 200b and 200c, respectively. Finally, the highest transparency regions are the furthest away from the center corresponding to the panels 200d and 200e, respectively.

FIG. 6b is a graph showing the variation of brightness level of the linear light source along the light axis of the light source. FIG. 6c is a graph showing the variation of brightness level of light along the light axis of the light source after a beam of light from the light source has passed through the light-channeling panel. As shown in FIGS. 6b and 6c, the uniformly bright region along the light axis for light emerging from the light-channeling panel 60 has a width greater than the light emerging from the original light sources 50.

Figure 7:
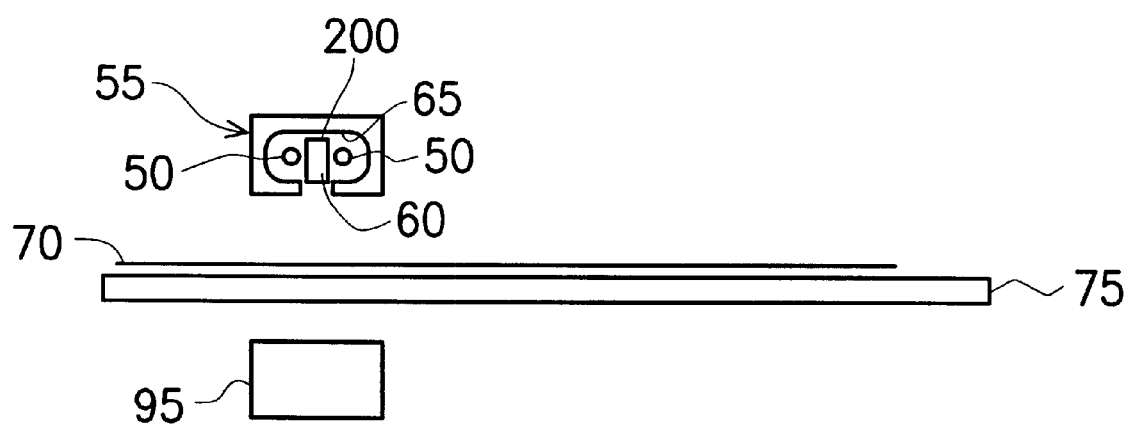
FIG. 7 is a schematic view of a scanning system capable of producing a more uniform brightness level along the axial direction of a light source according to a third preferred embodiment of this invention.

The scanner installation in the first and second embodiments both use a charge couple device (CCD) as an optical sensor. However, a contact image sensor (CIS) can also be used as the optical sensor. FIG. 7 is a schematic view of a scanning system capable of producing a more uniform brightness level along an axial direction of a light source according to a third preferred embodiment of this invention. The two linear light sources 50 have parallel light axes perpendicular to the page on which FIG. 7 lies and provide the necessary light beam for scanning the document 70. The light-channeling panel 60 is positioned between the two linear light sources 50. The light-channeling panel 60 and the reflector 65 are employed to even out the light produced by the two linear light sources 50 along a light axes. The CIS 95 picks up light from the linear light sources 50 after reflecting from the reflector 65 and passing through the light-channeling panel 60 and the document 70. Ultimately, a scan image is formed on CIS 95. Using a CIS, many reflecting mirrors in an optical transmission system are saved.

In summary, this invention improves the equally bright zone along the light axis of a scanner by varying the light transparency across the surface of a light-channeling panel. Since light transparency across the surface of a light-channeling panel can be modified more readily than other optical components, production cost is lowered. Moreover, as the useful range in the light axis is increased, length of light tube can be reduced for a specified working range. Hence, the volume of a scanner is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An installation on a scanner capable of increasing a usable scanning range along an axial direction of a light source, comprising:
    a linear light source having a light axis, wherein a brightness level near a mid-portion on the light axis is higher than brightness levels near two end portions of the light axis and the linear light source provides a light beam necessary for scanning a document; and
    a light-channeling panel adjacent to the linear light source, wherein the light-channeling panel concentrates more light from the linear light source in the two end portions rather than the mid-portion and the light-channeling panel is formed from a plurality of panel materials, each having a different light transparency, so that the mid-portion of the light axis has a lower light transparency than the two end portions of the light axis, wherein after light originating from the linear light source has passed through the light-channeling panel, a band of light having a more homogenous brightness level than the linear light source is produced.

2. The installation of claim 1, wherein the linear light source further includes a plurality of parallel linear light tubes.

3. An installation on a scanner capable of increasing the usable scanning range along the axial direction of a light source, comprising:
    a linear light source having a light axis, wherein a brightness level near a mid-portion on the light axis is higher than brightness levels near two end sections of the light axis, and the linear light source provides a light beam necessary for scanning a document;
    a light-channeling panel adjacent to the linear light source, wherein the light-channeling panel concentrates more light from the linear light source in the two end portions rather than the mid-portion and the light-channeling panel is formed using a plurality of panel materials, each having a different light transparency, so that the mid-portion of the light axis has a lower light transparency than the two end portions of the light axis, wherein after light originating from the linear light source has passed through the light-channeling panel, a band of light having a more homogenous brightness level than the linear light source is produced;
    an optical transmission system for transmitting a light image of the document produced by light from the linear light source that has passed through the light-channeling panel and reflected from the document; and
    an optical sensor that receives the light from the optical transmission system to produce a scan image.

4. The installation of claim 3, wherein the linear light source includes a plurality of parallel linear light tubes.

5. The installation of claim 3, wherein the optical transmission system further includes a lens.

6. The installation of claim 3, wherein the optical transmission system further includes one or more reflecting mirrors.

7. The installation of claim 6, wherein the optical transmission system further includes a lens.

8. An installation on a scanner capable of increasing a usable scanning range along an axial direction of a light source, comprising:
    a linear light source having a light axis, wherein a brightness level near a mid-portion on the light axis is higher than brightness levels near the end sections of the light axis, and the linear light source provides a light beam necessary for scanning a document;
    a light-channeling panel adjacent to the linear light source, wherein the light-channeling panel concentrates more light from the linear light source at the two end portions rather than the mid-portion and the light-channeling panel is formed using a plurality of panel materials, each having a different light transparency, so that the mid-portion of the light axis has a lower light transparency than the two end portions of the light axis, wherein after light originating from the linear light source has passed through the light-channeling panel, a band of light having a more homogenous brightness level than the linear light source is produced; and
    a contact image sensor, wherein the sensor receives a light image of the document produced by the light from the linear light source that has passed through the light-channeling panel and reflected from the document so that a scan image is formed.

9. The installation of claim 8, wherein the linear light source further includes a plurality of parallel linear light tubes.

* * * * *